Figure 1:

United States Patent

[11] 3,615,900

[72] Inventor Daeyong Lee
 Scotia, N.Y.
[21] Appl. No. 787,838
[22] Filed Dec. 30, 1968
[45] Patented Oct. 26, 1971
[73] Assignee General Electric Company

[54] PROCESS FOR PRODUCING ARTICLES WITH APERTURES OR RECESSES OF SMALL CROSS SECTION AND PRODUCT PRODUCED THEREBY
5 Claims, 2 Drawing Figs.

[52] U.S. Cl. .................................................. 148/11.5 R,
 156/18, 204/146
[51] Int. Cl. ...................................................... C22f 3/00,
 C23b 3/02
[50] Field of Search .......................................... 75/20, 176;
 204/146; 148/11.5; 156/18

[56] References Cited
UNITED STATES PATENTS

| | | | |
|---|---|---|---|
| 3,097,149 | 7/1963 | Lacroix ...................... | 204/146 |
| 3,236,706 | 2/1966 | Kuchek ...................... | 75/20 |
| 3,364,018 | 1/1968 | Kirkpatrick ................ | 75/176 |
| 3,434,827 | 3/1969 | Lemkey ...................... | 75/20 |

Primary Examiner—L. Dewayne Rutledge
Assistant Examiner—W. W. Stallard
Attorneys—Charles T. Watts, Paul A. Frank, Jane M. Binkowski, Frank L. Neuhauser, Oscar B. Waddell and Melvin M. Goldenberg ABSTRACT: A process for preparing a body with apertures of small cross section useful as a filter. An alloy comprised of at least two phases in the solid state is treated to produce at least one phase in a fine form distributed in a matrix comprised of the second or other phases. The resulting treated structure is etched to remove the finely distributed phase to produce apertures or, if desired, recesses.

Inventor:
Daeyong Lee,
by Jane M. Binkowski
His Attorney.

PROCESS FOR PRODUCING ARTICLES WITH APERTURES OR RECESSES OF SMALL CROSS SECTION AND PRODUCT PRODUCED THEREBY

The present invention relates generally to the art of producing articles having openings or apertures of uniquely small cross-sectional dimension.

It has long been recognized that a thin sheetlike body having openings of extremely small size would have a number of potentially important uses. In the past, metal filters have been made by weaving wires to form fine screens but the resulting holes are coarse. In another method, a fine metal powder is mixed with another powder which may be metal, and the mixture is sintered to form a dense mass which is then etched to remove one of the powders. The resulting product has pores which are coarse and not regular. Porous bodies such as expanded Vycor tubing and certain filter papers have holes of minimum cross-sectional dimension, but they cannot be used for a number of applications where high tensile strength, or electrical or metallic properties are desired. Although filters having holes of small cross section have also been prepared by irradiating a sheet of plastic and etching away the radiation tracks, this method cannot be used on metals.

By virtue of the present invention, openings or apertures can be formed in thin sheets of an alloy to produce articles for uses not met by prior art porous bodies. Further, in accordance with this invention, apertures or recesses of substantially uniform size can be produced. In addition, by partially or completely filling these apertures or recesses, as the case may be, with selected materials, composite bodies for a wide variety of special purposes and uses can be made.

Figure 2:
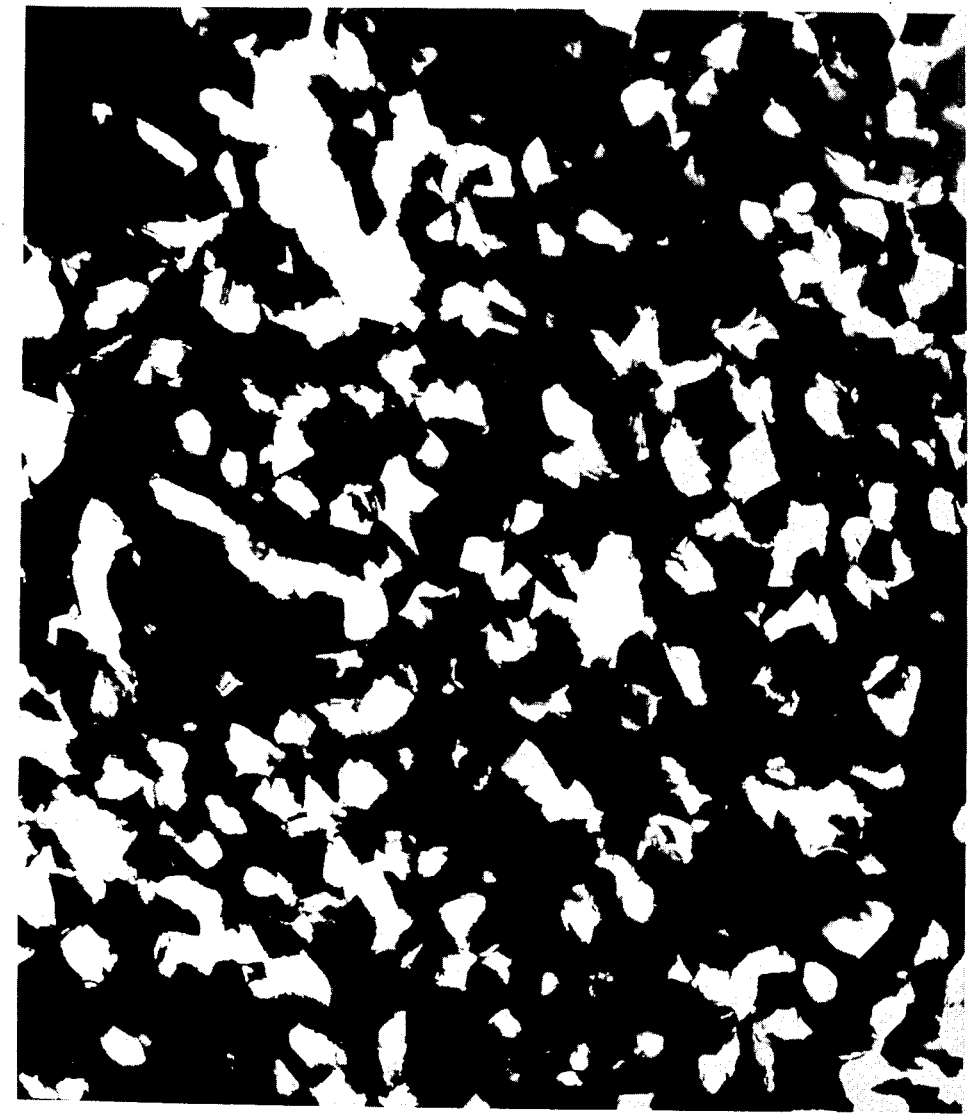

Those skilled in the art will gain a further and better understanding of the present invention from the detailed description set forth below, considered in conjunction with the figures accompanying and forming a part of the specification, in which:

FIG. 1 is a photomicrograph (magnified 750 times) of a workpiece of 94 percent by weight titanium—6 percent by weight molybdenum prepared as disclosed in the accompanying example showing the molybdenum-rich phase distributed in a fine form in a matrix comprised of the titanium-rich phase; and FIG. 2 is a transmission shadowgraph (magnified 10,000 times) of the workpiece of FIG. 1 after the molybdenum-rich phase had been substantially removed to produce holes by etching as disclosed in the accompanying example.

Described broadly and generally, an article of this invention is a solid body which has a plurality of recesses or apertures of minimum cross-sectional dimensions. As used herein, by the terms "pore," "aperture" or "hole" is meant a hole extending from one surface of the etched sample through the opposite surface. On the other hand, by the term "recess" is meant a hole extending from one surface of the etched sample and ending within the etched sample. In addition, the word "phase" defines a quantity of matter having substantially the same properties such as crystal structure and composition.

Briefly stated, the process of the present invention comprises providing an alloy having the characteristic of being comprised of at least two phases in the solid state. The alloy is treated to produce at least one phase in a fine form distributed in a matrix comprised of the second or other phases. The resulting treated structure is etched to remove the finely distributed phase to the desired depth to produce apertures or if desired, recesses.

In the present invention, an alloy comprised of at least two phases in the solid state is used, and such an alloy is treated to finely distribute one phase in a matrix of the other phase or phases. This treatment is carried out in a number of ways depending on the specific alloy and its composition.

In one embodiment of the present invention, a solid alloy comprised of at least two phases in the cast solid state is used. The alloy is cast and plastically deformed to substantially destroy its cast structure. The resulting alloy article is then heated to a temperature above its recrystallization temperature, which is the temperature at which the strained structure of the deformed alloy is replaced by a strain-free crystal structure. The rate of recrystallization depends largely on the specific recrystallization temperature used. Generally, the higher the recrystallization temperature used, the shorter is the period of time required to complete the recrystallization. Generally, the greater the deformation of the alloy, the smaller are the phase particles produced upon recrystallization. Representative of the alloys which can be treated in this manner are Ag–Cu, Ag–Al, Al–Co, Al–Cu, Al–Mg, Au–Ge, Au–In, Be–Fe, Be–Cu, Be–Ni, Be–Zr, Bi–Mg, C–Fe, C–Mn, C–Ti, Co–Cr, Fe–Mn and V–Zr.

In another embodiment of the present invention, an alloy which undergoes phase transformation is used. Such an alloy may be a precipitating type alloy, i.e. a solid solution alloy which cools from a single solid phase to precipitate a second phase. The process of treating such an alloy to produce the precipitated solid phase in a finely divided form of substantially uniform size comprises providing the alloy in cast form, plastically deforming the alloy to destroy its cast structure, heating it to a temperature at which it is a single-phase solid solution for a period of time sufficient to homogenize its structure, quenching it to room temperature to produce a supersaturated single-phase solid solution which is thermally unstable and heating the quenched solid solution to a temperature at which the second phase precipitates. The specific precipitating temperature and period of time at which the alloy is held at this temperature determines the size of the individual particles of the precipitating phase. The higher the precipitating temperature and the longer the alloy is maintained at such temperature, the larger are the particles of the precipitating phase, i.e. they coarsen with increasing temperature and time. On the other hand, the lower the precipitating temperature and the shorter the period of time at which the material is maintained at such temperature, the smaller are the particles of the precipitating phase, i.e. particles of the precipitated phase of the smallest size are attained by just heating the alloy to a temperature which is the lowest temperature at which the second phase precipitates. The particles of the precipitated phase will generally be of substantially the same size, but their specific shape or form will depend upon the particular alloy treated.

There are a number of alloys which undergo solid state precipitation during cooling to produce two phases. These alloys undergo such precipitation within a certain composition and temperature range, i.e. below a certain temperature for the particular alloy composition. Such compositions and precipitation temperatures are known from phase diagrams in the literature. Representative of the solid state precipitating type alloys useful in the instant process are Cu–Co, Al–Mg, Ag–Zn, Cu–Al, Ni–Ti, Cu–Be, Ni–Be and Bi–Sn.

In still another embodiment of the present invention, a solid alloy which has a two-phase structure but which undergoes martensitic transformation is used. The martensitic phase appears within a specific temperature range during cooling. The process of treating such an alloy to produce a phase in a finely divided form comprises providing the alloy in cast form, plastically deforming the alloy to destroy its cast structure, heating the alloy to a temperature above its recrystallization temperature and also above the temperature at which the martensitic transformation occurs for a time sufficient to homogenize the structure, quenching it to room temperature, heating the quenched solid to a temperature above the temperature at which the martensitic transformation occurs and working said hot solid to produce at least one phase in a fine form. It is believed that for this type of alloy, the working of the hot solid in the two-phase solid region, i.e. above the temperature at which the martensitic transformation occurs, results in at least one phase being produced in a fine form during cooling. Repeated heating of the alloy to the two-phase solid region above the martensitic transformation temperature, and reworking of the alloy in this region will produce a distributed phase of an even finer form. The alloy can be worked suitably by methods such as rolling or swaging.

There are a number of alloys of certain composition which are comprised of at least two phases and which undergo a martensitic transformation during cooling. Such alloys and their compositions are known from the literature. Representative of such alloys are Fe–C, Ti–V, Fe–Ni, Au–Cd, Fe–Ni–C.

Generally, in carrying out the instant process, the alloy components are melted together to obtain as uniform a molten sample as possible. The molten sample is then cast by a conventional method to the desired size.

The cast alloy is plastically deformed to destroy its cast structure. A number of methods are suitable for carrying out such deformation. For example, the alloy can be worked while hot and plastic by methods such as extrusion, rolling, compression or swaging. The specific temperature at which the alloy is hot worked depends largely on its malleability at such temperature.

The alloy is then treated to produce one phase in a fine form in a matrix comprised of the second or other phases. After such treatment, the resulting workpiece is preferably stabilized by heating it to just above its recrystallization temperature for a period of time necessary for stabilization.

Generally, prior to etching, the alloy is cut in a plane transverse to the working direction resulting in a specimen having a surface with a substantially uniformly distributed phase. Any conventional cutting means such as a moving saw, cutoff wheel or spark cutting can be used. For example, for the preparation of a filter, it is sliced transversely to a thickness depending largely on the strength of the alloy and alloy ductility in relation to the thickness desired in the final etched product. The slice of alloy can be etched directly, or preferably, it is mechanically polished prior to etching to remove the distorted surface layer generated during mechanical slicing. Such polishing is also useful to reduce the slice to a desired thickness, such as, for example, a foil.

The particular etchant used depends largely upon the specific composition of the phase to be removed as well as the remainder of the workpiece. Such compositions are known from phase diagrams in the literature. If the phase diagram is not available, the compositions are easily determinable by standard metallographic procedure and X-ray analysis. The etchant used should selectively etch the phase desired to be removed and should not significantly affect the remainder of the workpiece.

The etching can be carried out in a number of conventional ways. For example, the alloy article can be immersed in a solution of the etchant until the phase to be removed is etched sufficiently to form holes. However, if recesses rather than holes are desired, only one surface of the workpiece should be contacted with the etchant until the phase to be removed is etched to form recesses of the desired depth. In some instances, especially when the workpiece is as thin as a foil, electrolytic etching is preferred because it can be carried out at a fast but easily controlled rate. Upon completion of the etching, the workpiece is preferably rinsed with water or neutralizer to stop further etching action.

The etching procedure, whether by simple contact of the etchant with the workpiece or other etching method, can be manipulated to obtain holes of the desired size. Specifically, the etched holes can be as large as the particle size of the phase to be removed. However, holes having a size finer than the particle size can be produced by proper control of workpiece thickness and/or rate of chemical attack. In this respect, an important factor is the relative electrochemical nature of the phases, specifically their reactivity with etchants which are also electrolytes. For example, in a silver-rich silver-copper alloy, the copper phase is more reactive than the silver phase as shown by its position in the electromotive series. The copper atoms, therefore, have a greater tendency to go into solution as ions leaving electrons on the remaining copper thus making it negative and resulting in a galvanic effect. In the process of etching of the alloy sample of the present invention, there appears to be a concentration of this galvanic effect at the central portion of each particle being etched resulting in that area of the particle being preferentially attacked by the etchant until perforations occurs after which, the etching proceeds from the center to the periphery or boundary of the particle. This galvanic effect can be increased by increasing the rate of etching by the use of a proper electrolyte. Advantage of this effect can be taken in thicker samples, especially thicker foil samples, to produce fine holes since, in such instance, the etching can be stopped once the hole is formed and before the etching proceeds toward the phase boundary. On the other hand, in thinner foil samples, the etchant etches through the central portion of the particle at a rate too rapid to stop before it proceeds toward the particle boundary, and therefore, produces larger holes. In addition, the faster the rate of chemical attack, i.e. the faster the particle dissolves in the etchant, the more difficult the control of the etched hole size. Therefore, the rate of attack by an etchant should be made directly proportional to the thickness of the foil being etched. This rate may be controlled by proper selection of the type or reactivity of the etchant and/or method of etching.

In the present invention, the specific thickness of the workpiece can vary widely and will depend somewhat on its final use. As a minimum, it need only be thick enough to form a continuous film, generally about 1,000 Angstroms depending on the particular alloy used. Its minimum as well as maximum thickness is limited by the etchability of the phase which serves as matrix as well as the phase to be removed. The etched holes or recesses are of substantially uniform cross-sectional size. Their cross-sectional area, i.e. diameter depends largely on the final use of the product and may be as low as about 50 Angstroms or lower. There is no limit on the maximum cross-sectional area since, prior to etching, the worked alloy can be heated to enlarge the particles to the desired size. The present invention is especially useful for producing porous foils.

All parts, proportions or amounts used herein are by weight unless otherwise noted.

The invention is further illustrated by the following example.

EXAMPLE

A 94 percent titanium—6 percent molybdenum alloy button was cast in a vacuum by means of an electron beam. Each of the components was about 99.999 percent pure. The button was about three-fourths inch thick. Two opposed periphery portions of the button were machined off to produce parallel sides. The resulting structure, i.e. workpiece, had a diameter of 2 inches and was about three-fourths inch in height. It was wrapped in titanium foil to prevent oxidation of the titanium and heated in a furnace having an atmosphere of purified helium. All subsequent heatings of the alloy workpiece were also carried out in an atmosphere of purified helium. When the workpiece attained a temperature of 1,200° C., it was removed from the furnace and forged by means of a drop hammer to a thickness of 0.385 inch to destroy its cast structure.

The workpiece was then heated in the furnace to a temperature of 800° C. and was maintained at this temperature for 30 minutes to homogenize its structure and then water quenched to room temperature.

The workpiece was then heated to a temperature of 700° C. which is above the temperature at which the martensitic transformation occurs, and hot rolled for about 20 seconds. This heating and hot rolling procedure was repeated two more times and then the workpiece was water quenched to room temperature. Its thickness by this procedure was reduced to 0.243 inch. It was then reheated to 750° C., hot rolled and water quenched to room temperature resulting in a thickness of 0.187 inch. It was then heated to 800° C., hot rolled and water quenched to room temperature resulting in a thickness of 0.138 inch.

The workpiece was then heated to 750° C. and maintained at this temperature for one-half hour to stabilize its structure. It was then rapidly cooled in air to room temperature.

A slice, approximately 0.050 inch in thickness was cut transversely from the workpiece. This slice was ground and polished on both faces to produce a foil 0.003 inch thick. This foil was then thinned, i.e. electropolished to a thickness of 5 microns using a solution of 94 ml. acetic acid and 6 ml. perchloric acid. A micrograph of the foil is shown in FIG. 1. The thinned foil was then immersed at room temperature in an etchant comprised of 2 ml. concentrated (49 percent) hydrofluoric acid, 2 ml. concentrated (70 percent) nitric acid and 96 ml. water until the molybdenum phase was substantially removed. The removal of the molybdenum-rich phase was determined by periodically removing a section of the foil from the etchant and examining it under an electron microscope.

The final etched foil was then placed in an electron microscope, and a transmission shadowgraph was prepared and is shown in FIG. 2.

The final thickness of the etched foil was about 0.5 microns. The holes formed by removing the molybdenum-rich phase were substantially uniform in size, i.e. about 5,000 Angstroms in diameter. It appeared that the holes were substantially uniform throughout the thickness of the foil. The etched foil appeared to be suitable for use as a filter.

Since the porous etched solid of the present invention can be produced in thin foil form having high tensile strength, it is especially useful as a filter for the separation of very fine materials, as for example in the purification of water. Such a filter allows good fluid flow since its thinness offers little drag or resistance for fluid to pass through. In addition, its high tensile strength would allow pressure to be applied to the fluid to still further increase flow.

If desired, composites can be formed for a wide variety of special applications by filling the holes or recesses of the etched material of the present invention with a foreign material, i.e. a material different from that of the etched material. For example, they can be filled with superconductive material or with iron particles to produce oriented, single-domain ferromagnetic sheet.

It will be apparent to those skilled in the art that a number of variations are possible without departing from the scope of the invention.

Additional methods of treating alloys to produce a solid two-phase structure wherein one phase is distributed in a fine form in a matrix comprised of the second or other phases and wherein said finely distributed phase is selectively removed by etching and/or articles formed therefrom are disclosed and claimed in the following copending applications:

U.S. Pat. application Ser. No. 787,751 (Docket RD–1534) filed of even date herewith in the name of Daeyong Lee and Robert R. Russell and assigned to the assignee hereof and now U.S. Pat. No. 3,533,863 is directed to cast alloys having a two-phase lamellar structure. The cast structure is plastically deformed to convert the lamellar structure to a substantially equiaxed structure and one of the equiaxed phases is then selectively removed by etching to produce recesses or apertures.

U.S. Pat. application Ser. No. 787,802 (Docket RD–1589) filed of even date herewith in the name of Harvey E. Cline, Robert R. Russell and Warren DeSorbo, and assigned to the assignee hereof is directed to the directional solidification of a eutectic alloy to produce a structure wherein one of the phases is present as a plurality of substantially parallel rods passing through the second or other phases which serve as the matrix. The directionally solidified structure is etched to selectively remove the rodlike phase to form straight-through apertures or, if desired, recesses.

U.S. Pat. application Ser. No. 787,837 (Docket RD–1749) filed of even date herewith in the name of Harvey E. Cline, Robert R. Russell, and Warren DeSorbo, and assigned to the assignee hereof is directed to the preparation of thin porous metallic film with substantially parallel and uniform apertures by means of a replication technique. The etched article produced in the aforementioned U.S. Pat. application Ser. No. 787,802 (Docket RD–1589) is used as a master from which a negative replica is formed. The negative replica is then used as a substrate on which there is deposited metal which is then recovered from the substrate as a porous film.

What is claimed is:

1. A method for preparing a sheet with apertures of small substantially uniform cross-sectional size useful as a filter in the purification of water which comprises providing a cast alloy body which in the cast solid state is comprised of at least two phases, plastically working said cast alloy body to destroy its cast structure, heating said plastically worked body to a temperature above its recrystallization temperature to stabilize its structure, cooling said body to recrystallize said phases, cutting said alloy body in a plane transverse to the working direction to produce a sheet having a surface with a substantially uniformly distributed phase, contacting said sheet with an etchant which selectively etches and removes said finely distributed phase to form apertures, and rinsing said sheet to stop said etching action.

2. A method for preparing a sheet with apertures of small substantially uniform cross-sectional size useful as a filter in the purification of water which comprises providing a cast body of a precipitation type alloy which in the cast solid state is comprised of at least two phases, plastically working said cast alloy body to substantially destroy its cast structure, heating said resulting alloy body to its single-phase region to homogenize its structure, quenching said alloy body to room temperature to produce a supersaturated single-phase solid solution which is thermally unstable, heating said quenched alloy body to a temperature at which the second phase precipitates, cutting the resulting alloy body in a plane substantially transverse to the working direction to form a sheet having a surface with a substantially uniformly distributed phase, contacting said sheet with an etchant which selectively etches and removes said finely distributed phase to form apertures and rinsing said sheet to stop said etching action.

3. A method for preparing a sheet with apertures of small substantially uniform cross-sectional size useful as a filter in the purification of water which comprises providing a cast body of an alloy which undergoes martensitic transformation and which in the cast solid state is comprised of at least two phases, plasticaLLY working said cast alloy to substantially destroy its cast structure, heating said resulting alloy body to a temperature above its recrystallization temperature and also above the temperature at which the martensitic transformation occurs to substantially homogenize its structure, quenching said alloy to room temperature, heating said quenched alloy body to a temperature above the temperature at which the martensitic transformation occurs, working said heated alloy body at said temperature above the temperature at which the martensitic transformation occurs to produce at least one phase in a fine form in a matrix comprised of the second or other phases, cutting the resulting alloy body in a plane transverse to the working direction to produce a sheet having a surface with a substantially uniformly distributed phase, contacting said sheet with an etchant which selectively etches and removes said finely distributed phase to form apertures and rinsing said sheet to stop said etching action.

4. A method according to claim 3 wherein said alloy is a titanium-molybdenum alloy.

5. A method according to claim 7 wherein said alloy is reduced to a foil prior to etching.

* * *